United States Patent
Koch et al.

(10) Patent No.: US 10,515,425 B2
(45) Date of Patent: Dec. 24, 2019

(54) AGRICULTURAL IMPLEMENT AND IMPLEMENT OPERATOR MONITORING APPARATUS, SYSTEMS, AND METHODS

(71) Applicant: THE CLIMATE CORPORATION, San Francisco, CA (US)

(72) Inventors: Justin Koch, Deer Creek, IL (US); William Frank, Pekin, IL (US); Doug Sauder, Livermore, CA (US)

(73) Assignee: The Climate Corporation, San Francisco, CA (US)

( * ) Notice: Subject to any disclaimer, the term of this patent is extended or adjusted under 35 U.S.C. 154(b) by 260 days.

(21) Appl. No.: 15/300,760

(22) PCT Filed: Apr. 1, 2015

(86) PCT No.: PCT/US2015/023949
§ 371 (c)(1),
(2) Date: Sep. 29, 2016

(87) PCT Pub. No.: WO2015/153809
PCT Pub. Date: Oct. 8, 2015

(65) Prior Publication Data
US 2017/0032473 A1    Feb. 2, 2017

Related U.S. Application Data

(60) Provisional application No. 61/973,593, filed on Apr. 1, 2014.

(51) Int. Cl.
*G06Q 50/02* (2012.01)
*A01D 41/06* (2006.01)
(Continued)

(52) U.S. Cl.
CPC ............ *G06Q 50/02* (2013.01); *A01D 41/06* (2013.01); *A01D 41/127* (2013.01);
(Continued)

(58) Field of Classification Search
CPC ...... A01D 75/28; A01D 1/00–2101/00; G06Q 10/00–99/00
(Continued)

(56) References Cited

U.S. PATENT DOCUMENTS 3,935,866 A    2/1976   Northup et al.
4,136,508 A    1/1979   Coleman et al.
(Continued)

FOREIGN PATENT DOCUMENTS

EP    2 165 591 A1    3/2010
EP    2 929 773 A1    10/2015
EP    3418828 A1 *    12/2018   ............ A01D 41/127

OTHER PUBLICATIONS

Arslan, Selcuk & S. Colvin, Thomas. (2002). Grain Yield Mapping: Yield Sensing, Yield Reconstruction, and Errors. Precision Agriculture. 3. 135-154. 10.1023/A:1013819502827. (Year: 2002).*
(Continued)

*Primary Examiner* — Alan S Miller
*Assistant Examiner* — Jay-Ming Wang
(74) *Attorney, Agent, or Firm* — Hickman Palermo Becker Bingham LLP

(57) ABSTRACT

Apparatus, systems and methods for monitoring one or more agricultural implements during agricultural operations and for monitoring operator performance criterion. In some embodiment, the operator performance criterion may be reported to a monitor on the agricultural implement as well as a remote fleet monitor.

19 Claims, 9 Drawing Sheets

(51) Int. Cl.
  *G06Q 10/06*  (2012.01)
  *A01D 41/127*  (2006.01)
(52) U.S. Cl.
  CPC ..... *A01D 41/1271* (2013.01); *A01D 41/1273* (2013.01); *G06Q 10/06398* (2013.01)
(58) Field of Classification Search
  USPC ................................................ 705/7.11–7.42
  See application file for complete search history.

(56) References Cited

U.S. PATENT DOCUMENTS

| | | | | |
|---|---|---|---|---|
| 5,343,761 | A | * | 9/1994 | Myers ................... A01C 7/105 73/861 |
| 6,681,551 | B1 | | 1/2004 | Sheidler et al. |
| 2003/0060245 | A1 | | 3/2003 | Coers et al. |
| 2004/0194442 | A1 | * | 10/2004 | Maertens ............. A01B 79/005 56/10.2 R |
| 2007/0192173 | A1 | * | 8/2007 | Moughler ............. G06Q 10/06 705/7.21 |
| 2010/0036696 | A1 | | 2/2010 | Lang et al. |
| 2010/0077715 | A1 | | 4/2010 | Hohlfeld et al. |
| 2010/0145581 | A1 | | 6/2010 | Hou |
| 2011/0072773 | A1 | | 3/2011 | Schroeder et al. |
| 2012/0253743 | A1 | | 10/2012 | Schmidt |
| 2012/0253744 | A1 | | 10/2012 | Schmidt |
| 2015/0199775 | A1 | * | 7/2015 | Pfeiffer ........... G06Q 10/06398 705/7.42 |

OTHER PUBLICATIONS

European Patent Office, "Search Report" in application No. 15774051.5-1656, dated Nov. 17, 2017, 7 pages.
European Claims in application No. 15774051.5-1656, dated Nov. 2017, 2 pages.
Chinese Patent Office, "Office Action" in application No. 201580011693.7, dated Jul. 3, 2018, 1 page.
Chinese Claims in application No. 201580011693.7, dated Jul. 2018, 3 pages.
International Search Report, in application No. PCT/US2015/023949, dated Jul., 7, 2015, 2 pages.
Current Claims in application No. PCT/US2015/023949, dated Jul. 2015, 3 pages.
Chilean Patent Office, "Expert Examiner Report" in application No. 201602141, dated Jan. 22, 2018, 7 pages.
Chilean Claims in application No. 201602141, dated Jan. 2018, 4 pages.
China Office Action in application No. 2015800116937, dated Mar. 5, 2019, 4 pages.
China Claims in application No. 201580116937 dated Mar. 2019, 2 pages.
National Intellectual Property Administration, PRC, "Search Report" in application No. 201580011693.7, dated Sep. 27, 2019, 8 pages.
Current Claims in application No. 201580011693.7, dated Sep. 2019, 4 pages.
Brazilian Patent Office, "Search Report" in Application No. 1120160200730, dated Sep. 9, 2019, 2 pages.
Brazilian Claims in application No. 1120160200730, dated Sep. 2019, 3 pages.

* cited by examiner

Settings - Combine 2 - 10:36 a.m. - October 1, 2024

Separator

| Concave Clearance | Rotor Speed | Shoe Clearance | Chaffer Clearance |
|---|---|---|---|
| 16 mm | 397 RPM | 8 mm | 11 mm |

Header

| Deck Plate Gap | Feeder Speed | Reel Speed | Header Height |
|---|---|---|---|
| 39 mm | 460 RPM | 400 RPM | 28 cm |

FIG. 9

AGRICULTURAL IMPLEMENT AND IMPLEMENT OPERATOR MONITORING APPARATUS, SYSTEMS, AND METHODS

CROSS-REFERENCE TO RELATED APPLICATIONS

This application is a U.S. National phase of International Application No. PCT/US2015/23949, filed Apr. 1, 2015, which claims priority to U.S. Provisional Application No. 61/973,593, filed Apr. 1, 2014. The contents of both applications are incorporated herein by reference as if fully set forth herein.

BACKGROUND

In recent years, the size of farming concerns has increased, increasing the number of implements and operators required to complete agricultural operations within time frames constrained by agronomics, weather and soil conditions. Existing solutions for monitoring implement performance are ineffective. As such, there is a need for improved apparatus, systems and methods of monitoring implement and operator performance.

DESCRIPTION OF THE DRAWINGS

FIG. 9 illustrates a combine monitoring screen.

DESCRIPTION

Monitoring Systems

Figure 1:
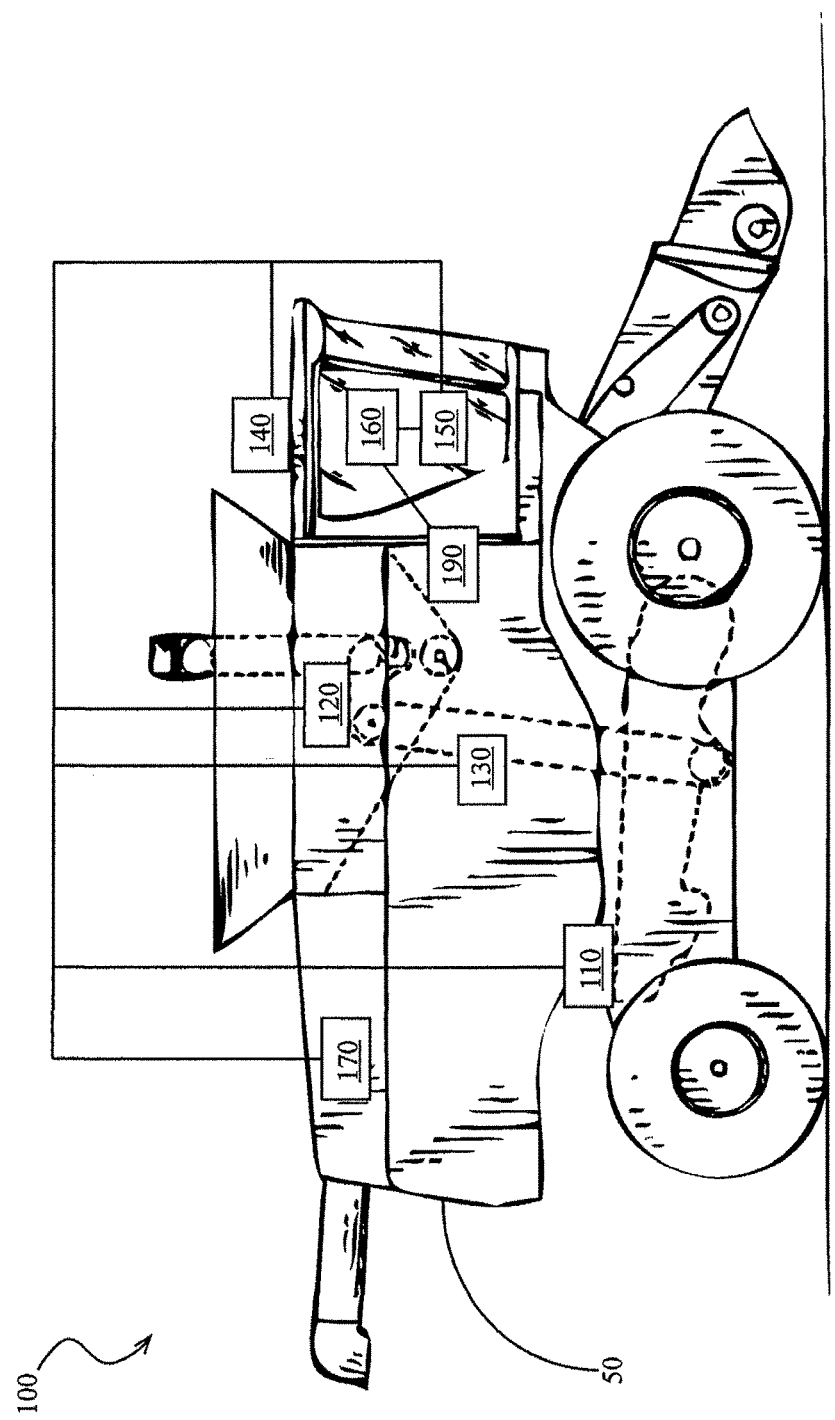
FIG. 1 schematically illustrates an embodiment of a harvester monitoring system superimposed on a combine harvester.

A monitoring system 100 is illustrated in FIG. 1 schematically superimposed on an agricultural implement 50, such as a combine harvester. In this embodiment, the monitoring system 100 includes a grain loss sensor 110, a yield sensor 120, a moisture sensor 130, a global positioning receiver 140, a monitor 160, a processing board 150, and a tachometer 170.

The grain loss sensor 110 is preferably disposed and configured to measure a rate of grain loss, e.g., grain discarded along with tailings from the combine. As illustrative examples, the grain loss sensor may comprise one of the embodiments disclosed in U.S. Pat. Nos. 3,935,866, 4,360, 998 and 6,869,355 and European Patent No. 0023500, the disclosures of which are hereby incorporated herein in their entirety. In some embodiments a plurality of grain loss sensors is disposed to measure grain loss at multiple post-threshing locations in the combine. In some embodiments the grain loss sensor may comprise an electromagnetic field transmitter and receiver configured to detect grain loss by measuring obstruction of an electromagnetic field through which grain is discarded from the combine. In such embodiments, the monitor 160 preferably determines an amount of grain loss using an empirical database relating grain loss to signal criteria (e.g., amplitude, average value, frequency) of the signal generated by the electromagnetic sensor. In other embodiments, the grain loss sensor may comprise an electromagnetic transmitter and receiver (e.g., a radar system) disposed and configured to measure the reflectivity of grain being discarded from the combine. In such embodiments, the monitor 160 preferably determines an amount of grain loss using an empirical database relating grain loss to signal criteria (e.g., amplitude, average value, frequency) of the signal generated by the reflectivity sensor. In embodiments in which an electromagnetic and/or radar reflectivity sensor is used, the sensor preferably comprises an array of transmitters and receivers disposed to measure the presence of grain in all or a substantial portion of the material flow discarded from the combine. The grain loss sensor 110 is preferably in electronic and/or data communication with the monitor 160.

The yield sensor 120 is preferably disposed and configured to measure a flow rate of clean grain in a clean grain elevator of the harvester. As illustrative examples, the yield sensor 120 may comprise one of the embodiments disclosed in U.S. Pat. No. 5,343,761 and International Patent Application No. PCT/US2012/050341, the disclosures of both of which are incorporated by reference herein. The yield sensor 120 is preferably in electronic communication with the monitor 160.

The moisture sensor 130 preferably comprises a sensor disposed to measure the moisture of grain being lifted by the clean grain elevator of the combine. For example, in some embodiments the moisture sensor 130 comprises a capacitive moisture sensor such as that disclosed in U.S. Pat. No. 6,285,198, the disclosure of which is incorporated by reference herein. The moisture sensor 130 is preferably mounted to the side of the clean grain elevator housing adjacent the location where grain piles are lifted vertically before reaching the top of the clean grain elevator. In other embodiments, the moisture sensor 130 may be mounted in the grain tank of the combine and disposed to measure the moisture of grain deposited in the grain tank. The moisture sensor 130 is preferably in data communication with the monitor 160. The term "data communication" as used herein is intended to encompass wireless (e.g., radio-based), electrical, electronic, and other forms of digital or analog data transmission.

The global positioning receiver 140 preferably comprises a receiver configured to receive a signal from the global positioning system (GPS) or similar geographical referencing system. The global positioning receiver 140 is preferably mounted to the top of the harvester 50. The global positioning receiver 140 is preferably in data communication with the monitor 160.

The tachometer 170 is preferably configured and disposed to measure the engine speed of the combine as is known in the art. The tachometer 170 is preferably in data communication with the monitor 160.

The processing board 150 preferably comprises a central processing unit (CPU) and a memory for processing and storing signals from the system components 110, 120, 130, 140, 170 and transmitting data to the monitor 160. The monitor 160 is preferably in data communication with the processing board 150.

The monitor 160 preferably comprises a central processing unit (CPU), a memory and graphical user interface operable to display yield measurements and yield maps to the operator and to accept instructions and data from the operator. The monitor 160 is preferably mounted inside the cab of the harvester 50 within the view and reach of the operator. The monitor 160 is preferably in data communication with a CAN network 190 or other data bus of the harvester for receiving and transmitting signals to various systems and components of the harvester.

Figure 7:
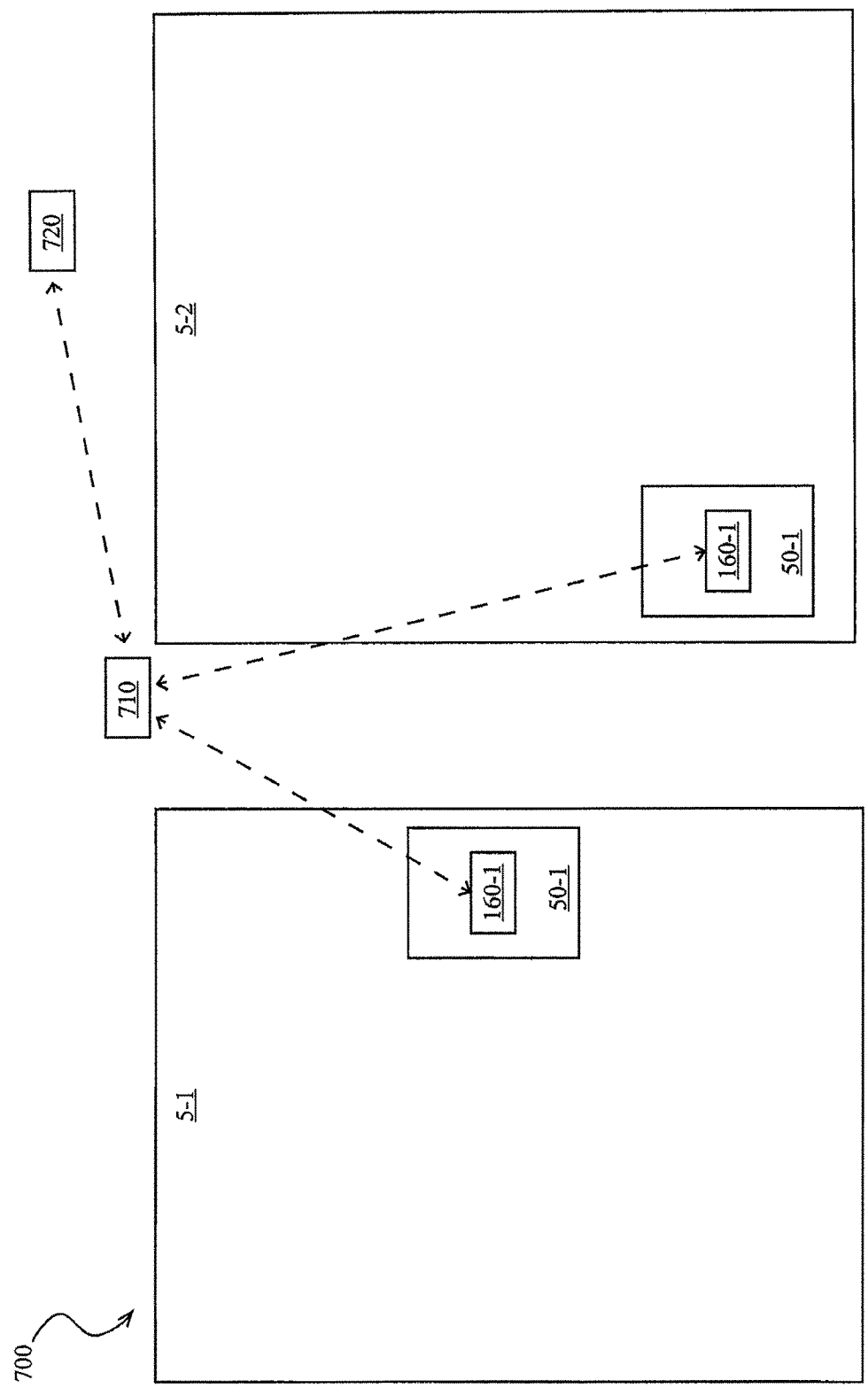
FIG. 7 illustrates an embodiment of a monitoring system for monitoring a plurality of harvesters.

Turning to FIG. 7, a fleet monitoring system 700 is illustrated including a plurality of harvesters 50 each having a monitoring system 100 including a monitor 160. Each monitor 160 preferably includes a communication device (e.g. a cellular modem) for transmission of data (e.g., grain loss data) a fleet monitor 720. Communication between the fleet monitor 720 and the monitors 160 may be enabled by communication with the cloud 710; data may also be stored and processed on the cloud. The fleet monitor may comprise a personal computer or tablet. The fleet monitoring system 700 is preferably configured to display a screen of one or more of the monitors 160 on the fleet monitor 720 (or share other data) using a communication protocol such as Web-Socket.

Harvester Monitoring Methods

Figure 8:
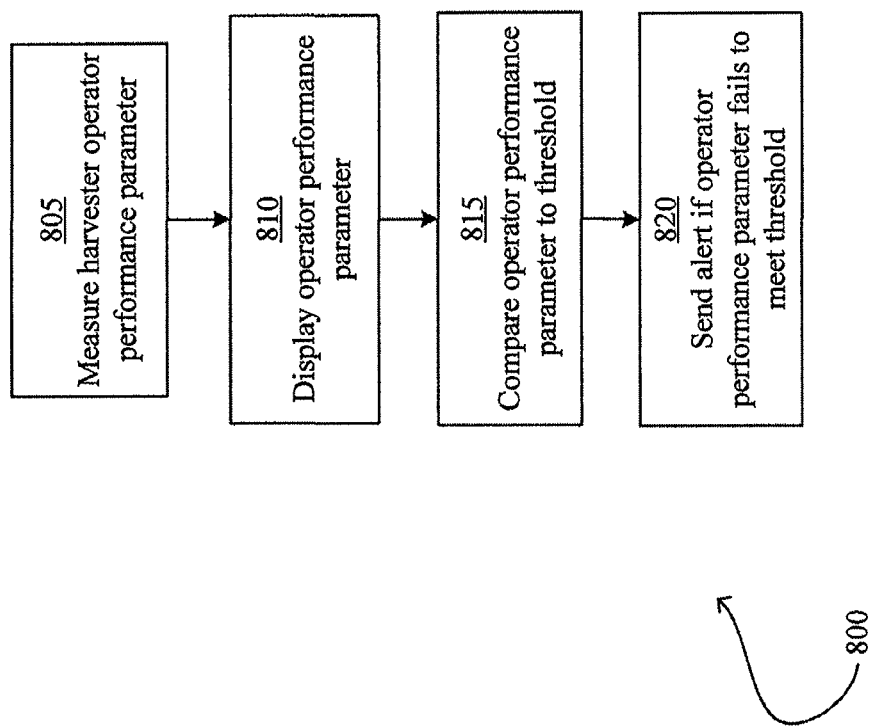
FIG. 8 illustrates an embodiment of a process for monitoring a harvester.

The system 100 preferably carries out an operation monitoring process 800 illustrated in FIG. 8. At step 805, the system 100 preferably measures an operator performance parameter or operator performance criterion. At step 810, the system 100 preferably displays an operator performance parameter, e.g., to the operator on the monitor 160 or to another operator on the fleet monitor 720. At step 815, the system 100 preferably compares the operator performance parameter to a threshold value. At step 820, the system 100 preferably sends and displays an alert (e.g., to the operator on the monitor 160 or to another operator on the fleet monitor 720) if the operator performance parameter fails to meet the threshold. It should be appreciated that some thresholds comprise a minimum desired value while others may comprise a maximum desired value.

Figure 3:
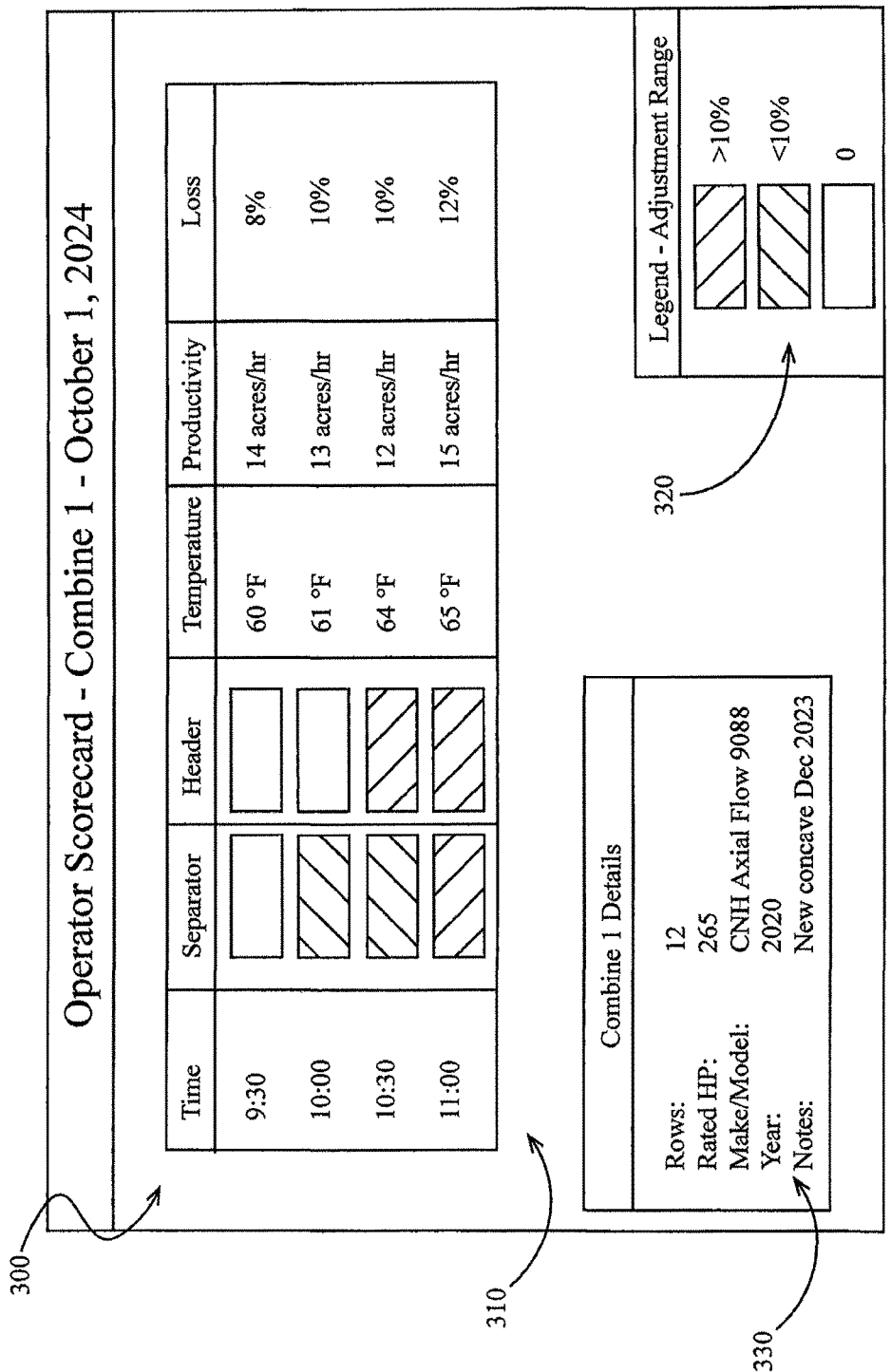
FIG. 3 illustrates an embodiment of a screen for displaying operator performance parameters for a harvester.

The monitor 160 and/or the fleet monitor 720 preferably display a screen 300 including one or more operator performance parameters as illustrated in FIG. 3. The screen 300 may comprise an operator scorecard including a plurality of operator scores. The screen 300 preferably includes a table 310 comprising a set of operator performance parameters. In the embodiment of FIG. 3, a value of each operator performance parameter is displayed for a plurality of times (e.g., every half hour during the harvesting operation).

The operator performance parameters displayed in table 310 preferably include separator adjustment level, header adjustment level, productivity and grain loss. The operator performance parameters may also include an operational speed of the separator.

In the table 310 of FIG. 3, the "Separator" column displays separator adjustment ranges at a plurality of times during operation. The separator adjustment range is preferably calculated by determining a range of remote adjustment of one or more separator components, e.g., concave clearance, rotor speed, fan speed, shoe (i.e., lower sieve) clearance, or chaffer (i.e., upper sieve) clearance. The "Header" column displays header adjustment ranges at a plurality of times during operation. The header adjustment range is preferably calculated by determining a range of remote adjustment of one or more header components, e.g., feeder house speed, feeder height pitch, feeder house roll, deck plate gap, reel speed, reel fore/aft position, and reel height.

The remote adjustments of header and separator components are preferably determined based on command or measurement signals on the CAN network 190 of the harvester or by direct measurement.

In the illustrated embodiment, ranges of the adjustment of are displayed in the "Separator" and "Header" columns, e.g., as calculated by dividing the difference between maximum and minimum values by the minimum value over a predetermined time period such as a half hour. In other embodiments, the frequency of separator and header adjustments (e.g., by amounts greater than 1%) is displayed instead of or in addition to the range of adjustment. In the illustrated embodiment, the range of separator and header adjustments is represented by a pattern or color associated with a range of adjustment ranges displayed in a legend 320; in other embodiments, a numerical value of the adjustment is additionally or alternatively displayed.

In the table 310 of FIG. 3, the "Temperature" column displays atmospheric temperature at various times during the operation. In other embodiments, other weather data are reported in the table 310, e.g., dew point, relative humidity, cloud cover, and wind speed. The weather data are preferably obtained from the cloud 710, e.g., from a weather database.

In the table 310 of FIG. 3, the "Productivity" column displays a measure of harvest productivity, e.g., determined by calculating the area harvested by the combine during a predetermined time period such as one hour. The area harvested by the combine may be determined as is known in the art. In other examples, the measure of harvest productivity may be measured by calculating the bushels of grain harvested during a particular time period or the amount of fuel used during a predetermined time period.

In the table 310 of FIG. 3, the "Loss" column displays a measure of grain loss at various times during the operation. The grain loss measurements are preferably determined from the signal generated by the grain loss sensor 110. The grain loss measurements may comprise grain loss measured at the shoe (i.e., lower sieve) or at the chaffer (i.e., upper sieve). The grain loss measurements may be reported as a percentage (as illustrated) or as an absolute value (e.g., bushels per acre).

It should be appreciated that the rows of data displayed in the table 310 correspond to the same or nearly the same time during operation, allowing the operator to compare weather and other conditions to the corresponding operator performance criteria.

The screen 300 also preferably includes a machine details window 330 displaying harvester characteristics such as those illustrated in FIG. 3. The harvester characteristics may be entered for each harvester via the monitor 160.

Figure 4:
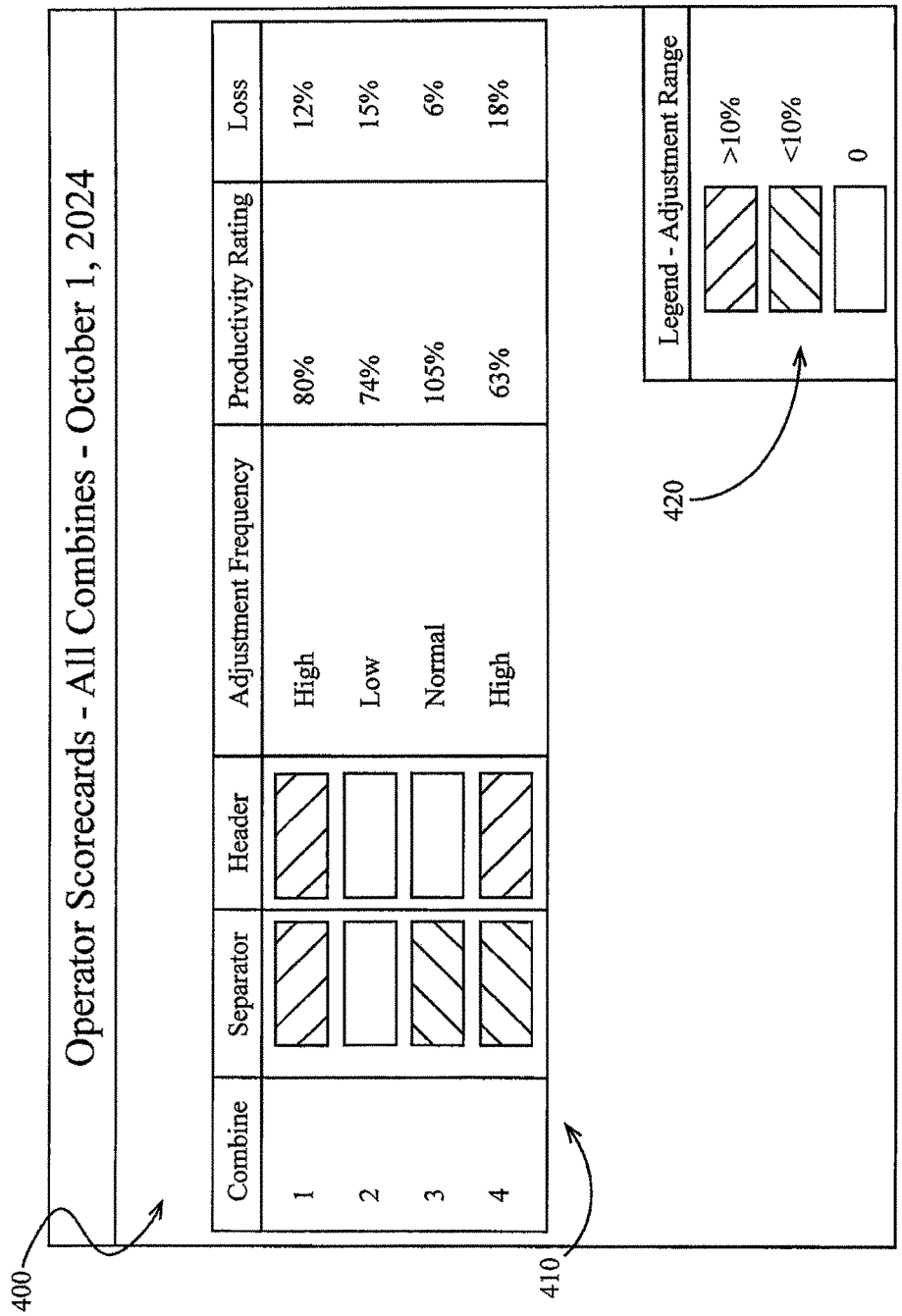
FIG. 4 illustrates an embodiment of a screen for displaying operator performance parameters for a plurality of harvesters.

Turning to FIG. 4, the fleet monitor 720 (and/or the monitor 160) preferably displays a screen 400 for displaying operator scores of a plurality of combines. The screen 400 may comprise an operator scorecard including a plurality of operator scores. The columns of table 410 include information similar to that displayed in FIG. 3, except that a single row displays a single value for a particular harvester. Data in each row preferably reflects a current value or an average value over a period during the operation (e.g., the current day, the time spent in the current field, or the previous half hour). The column labeled "Adjustment Frequency" displays an assessment of the frequency of adjustment (e.g., "High", "Normal", and "Low" may reflect adjustments greater than 1% at greater than 10 times per hour, between 5 and 10 times per hour, and less than 5 times per hour, respectively). A legend 420 relates a plurality of adjustment ranges to a color or pattern as with the legend 320. Tapping or clicking on a row of data (or the harvester number in the "Combine" column) preferably instructs the fleet monitor 720 to display the screen 300 for that harvester associated with that row.

In the table 410 of screen 400, the column labeled "Productivity Index" preferably includes a current productivity index determined by the system 100 for each harvester. The productivity index preferably reflects the productivity of the operation. In some embodiments, the productivity index is calculated using the relation:

$$\text{Productivity Index} = \frac{B}{T}$$

Where: B=bushels harvested over a period T, preferably determined by integrating the flow rate reported by the yield sensor 120 over the period T.

In some embodiments, the value of B is corrected by removing the amount of grain loss reported by the grain loss sensor 110. Where grain loss is reported as a fraction, bushels harvested B are preferably multiplied by fractional grain loss. Where grain loss is reported as a number of bushels lost, the number of bushels lost is preferably subtracted from the bushels harvested B. The period T may be a period on the order of a second, a minute, a half hour, or an hour prior to the current time, or may comprise the time spent harvesting in the field or during the current day.

In some embodiments, the time period used to calculate the productivity index preferably excludes periods when the harvester is stopped and/or not harvesting. For example, the system 100 preferably excludes data gathered during times when the harvester speed (as reported by the GPS receiver or a radar speed sensor) is less than a threshold speed (e.g., 0.5 miles per hour). Additionally, system 100 preferably excludes data gathered during times when the harvester is not traveling across a previously unharvested area, when the flow rate reported by the yield sensor 120 is less than a threshold (e.g., 1 bushel per second), or when a crop-engaging component of the combine (e.g., the header or a component thereof) is not in an operative mode.

Figure 5:
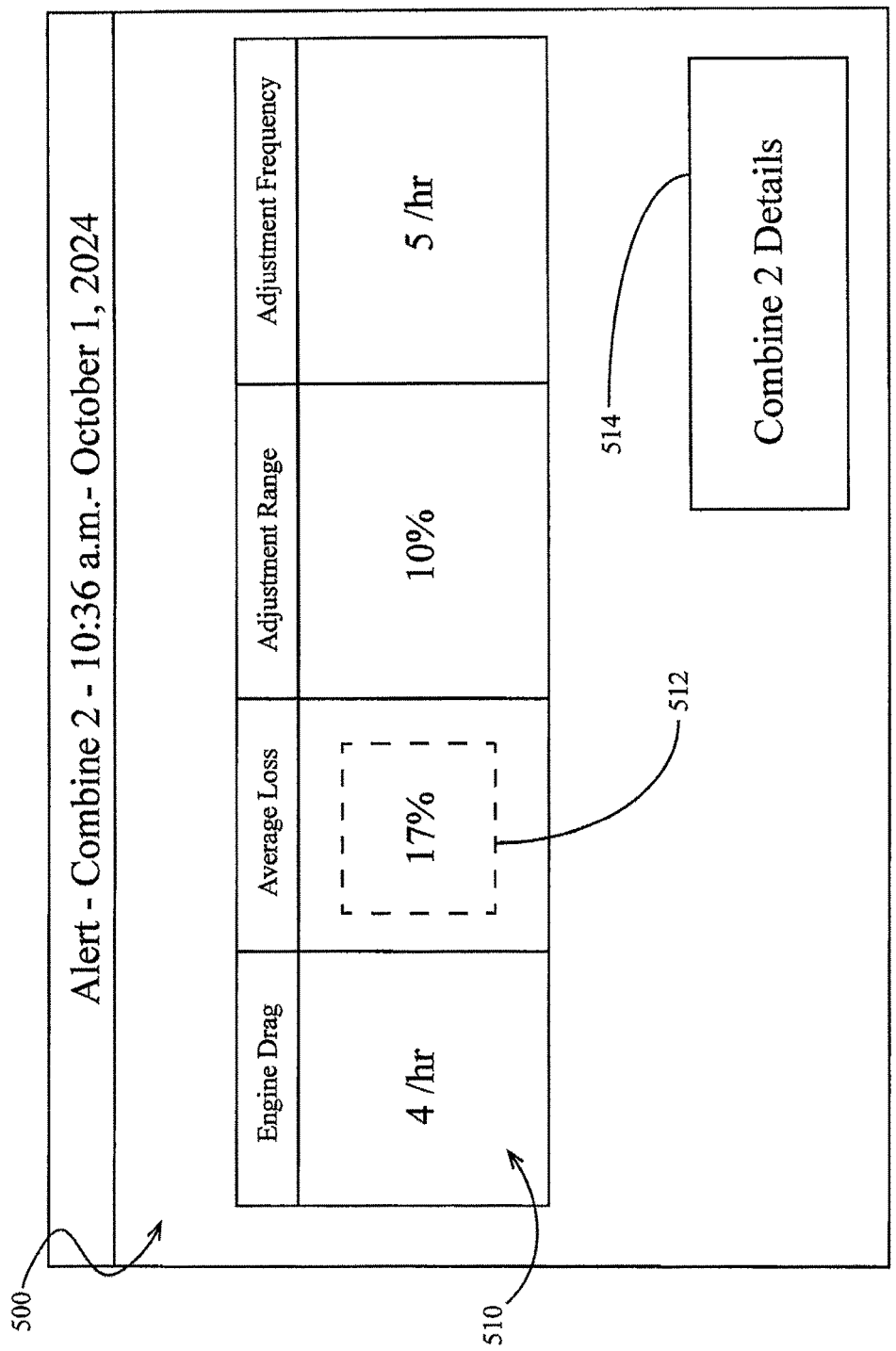
FIG. 5 illustrates an embodiment of an operator performance parameter alert.

Turning to FIG. 5, an exemplary embodiment of an alert generated at steps 815, 820 of the process 800 described above is illustrated. The fleet monitor 720 (and/or the monitor 160) preferably displays an alert screen 500 including one or more operator performance criteria that have exceeded the threshold of step 815. The screen 500 comprises an alert for one of the harvesters ("Combine 2" in the illustrated embodiment). The illustrated table 510 includes the following operator performance criteria: "Engine Drag" reports the number of times in which the engine speed reported by tachometer 170 is below a predetermined threshold; "Average Loss" reports a percentage grain loss as described above; "Adjustment Range" reports a range of separator or header component adjustment as described above; and "Adjustment Frequency" reports a frequency of separator or header component adjustment as described above. A border 512 or other indicator preferably indicates one or more operator performance criteria that have exceeded the associated threshold of step 815. Selection of a button 514 or other selection interface preferably prompts the fleet monitor 720 to display the screen 300 for that screen.

Turning to FIG. 9, the fleet monitor 720 (and/or the monitor 160) preferably displays a settings screen 900. The settings screen preferably displays the current machine settings of various components of one or more harvesters. In the illustrated embodiment, a table 910 displays current separator component settings. The screen 900 preferably displays a plurality of separator component settings including concave clearance, rotor speed, fan speed, shoe (lower sieve) clearance, and chaffer (upper sieve) clearance. In the illustrated embodiment, a table 920 displays current header component settings. The screen 900 preferably displays a plurality of header component settings including feeder house speed, pitch and roll; deck plate gap; and reel speed, fore/aft position and height. The system 100 preferably determines component settings based on signals sent from or to each component via the CAN network 190.

Grain Loss Mapping

Figure 6:
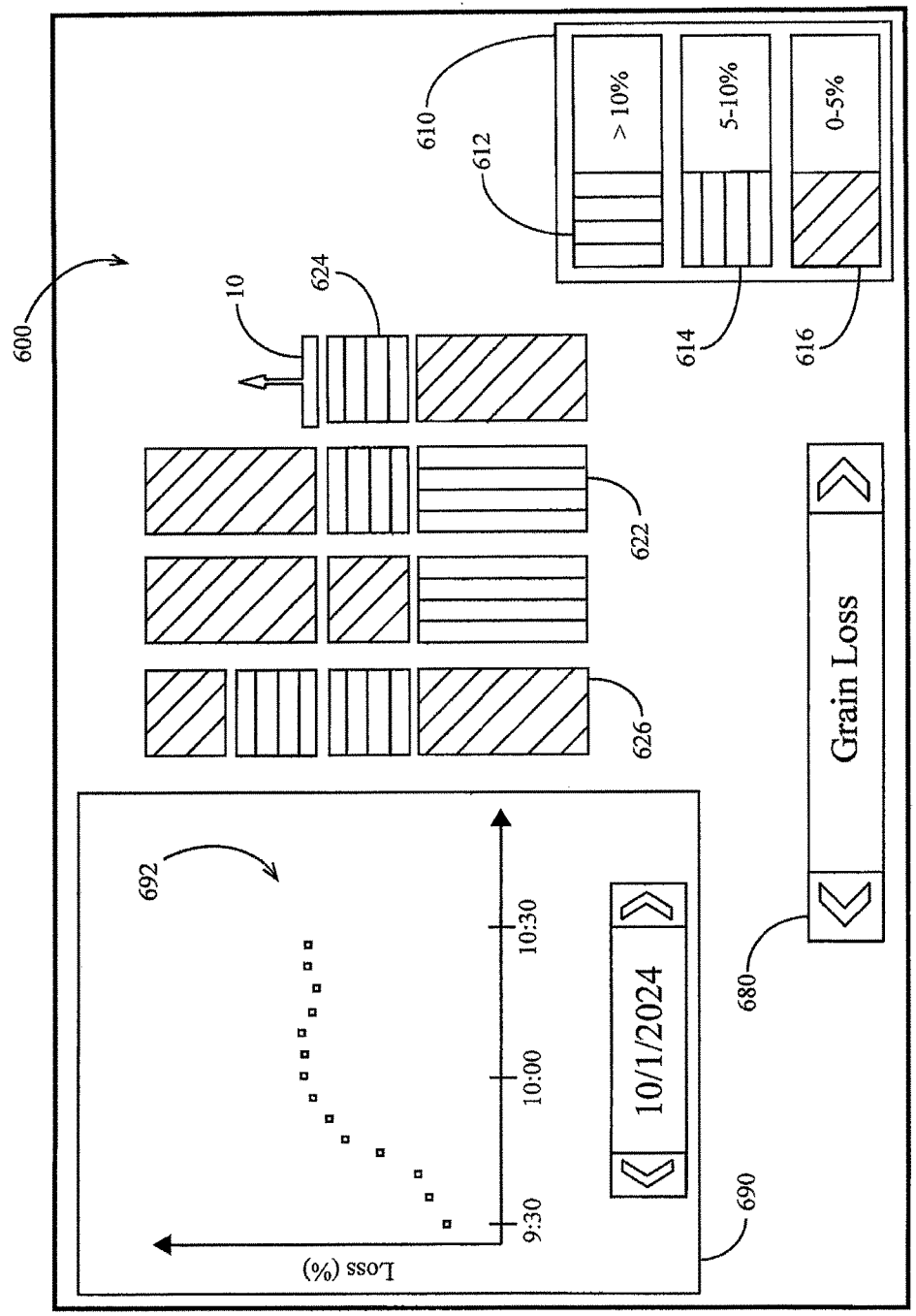
FIG. 6 illustrates an embodiment of a grain loss map screen.

Turning to FIG. 6, the fleet monitor 720 (and/or the monitor 160) preferably displays a grain loss map screen 600 including mapped spatial regions associated with a plurality of ranges of grain loss. The colors or patterns of the regions 622, 624, 626 are preferably associated with legend ranges 612, 614, 616 of a legend 610. The current location and direction of the harvester is preferably indicated by a harvester icon 10. An interface 680 preferably allows the user to request other maps or screens. The map screen 600 also preferably includes a time plot window 690 plotting data points 692 relating grain loss to times during the operation.

Grain Loss Sensor Sensitivity Automation

In some embodiments, the amount of grain loss reported and/or mapped is determined based on the amplitude of the grain loss sensor signal and one or more secondary grain loss measurement criteria.

In some such embodiments, the secondary grain loss measurement criteria comprise a crop type (e.g., identified by the operator via the graphical user interface). The secondary grain loss measurement criteria may also comprise a secondary grain loss sensor signal criterion such as the frequency of the grain loss sensor signal. In some embodiments, the monitor 160 may determine a multiplier to be applied to the raw signal amplitude based on an empirical database relating secondary grain loss sensor signal criterion values (e.g., signal frequency values) to multipliers for the selected crop type. The multiplier is preferably then applied to the signal amplitude to determine the reported grain loss.

Speed Recommendation and Control

Figure 2:
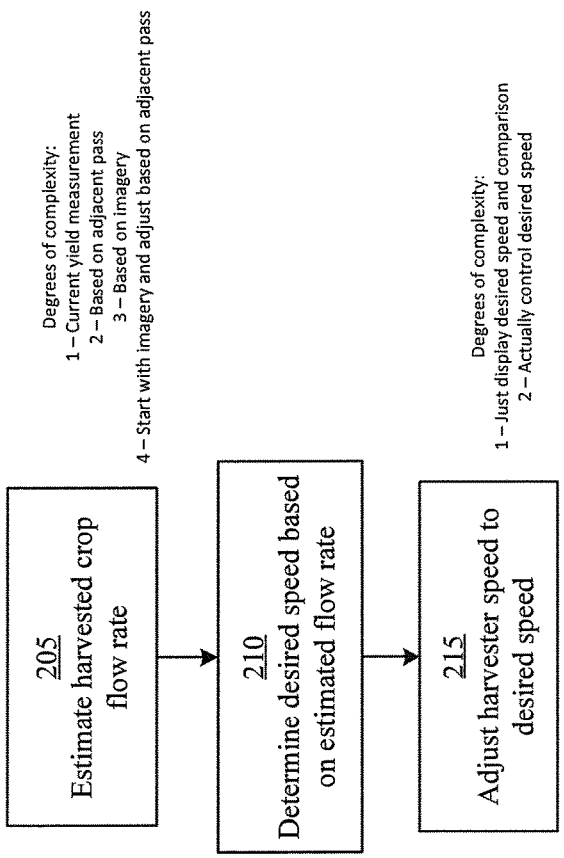
FIG. 2 illustrates an embodiment of a process for recommending and/or modifying a harvester speed.

Turning to FIG. 2, the monitoring system 100 preferably carries out a process 200 for recommending and/or controlling a speed of the harvester.

At step 205, the system 100 preferably estimates a harvested crop flow rate. In some embodiments the harvested crop flow rate is estimated based on the current flow rate reported by the yield sensor 120. However, because the flow rate measured by the yield sensor is generally delayed relative to the yield being harvested, the currently reported flow rate does not correspond to the yield of the crop being taken into the header. Thus in some embodiments the harvested crop flow rate is estimated based on the yield previously measured and associated with a location adjacent to current position of the combine header; for example, the flow rate may be estimated to have the same value as that previously measured and associated with a location adjacent to the current position of the combine header, e.g., a location harvested during the immediately previous pass and immediately adjacent to the header. When no adjacent location has been harvested, the flow rate may be determined based on the rate reported by the yield sensor 120 as described above. In still other embodiments, crop health imagery of the field (e.g., aerial or satellite NDVI imagery taken during the current season) may be used to estimate the local flow rate; for example, the monitor may have a lookup table stored in memory which relates NDVI levels to estimated flow rates. In other embodiments, the flow rate estimated based on crop health imagery may be scaled based on the difference between the imagery-based flow rate estimate for a location already harvested and the flow rate associated with the location based on the signal reported by the yield sensor 120; for example, if the imagery-based estimate has over-predicted by 10% for a set of locations previously harvested in the field currently being harvested, the system 100 may reduce the current imagery-based estimate by 10%.

However the current flow rate is determined, a desired speed is preferably determined based on the estimated flow rate at step 210. The monitor 160 preferably has a lookup table stored in memory relating desired speeds to estimated flow rates; desired speeds preferably increase (e.g., in a linear fashion) with estimated flow rates. In other embodiments, the desired speed may be selected based on other criteria of the current harvesting operation, e.g., grain loss.

At step 215, the harvester speed is preferably adjusted to the desired speed. In some embodiments, the desired speed is displayed on the monitor, prompting the operator to adjust the harvester speed to the desired speed. In other embodiments, the monitor 160 sends a speed command to the harvester speed control system (e.g. via the CAN network 190) such that the speed control system adjusts the harvester speed to the desired speed unless the operator overrides the command or the speed control system.

Although the foregoing description is presented with respect to combine harvesters, it should be appreciated that other implements, e.g., seeding and liquid application implements may be monitored using systems, methods and apparatus similar to those disclosed herein.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method for monitoring operator performance during operation of an agricultural implement, comprising:
    monitoring an operating characteristic of an agricultural implement during performance of an agricultural operation;
    monitoring a flow rate of the agricultural implement;
    storing a lookup table which relates desired speeds to estimated flow rates;
    using the lookup table, determining a desired speed of the agricultural implement for the flow rate of the agricultural implement;
    adjusting the speed of the agricultural implement to the desired speed;
    determining an operator performance criterion based on said monitored operating characteristic; and
    displaying said operator performance criterion to the operator.

2. The method of claim 1, wherein said agricultural implement comprises a combine harvester, and wherein said operating characteristic is a separator component adjustment range.

3. The method of claim 1, wherein said agricultural implement comprises a combine harvester, and wherein said operating characteristic is a header component adjustment frequency.

4. The method of claim 1, wherein said agricultural implement comprises a combine harvester, and wherein said operating characteristic is an engine drag measurement.

5. The method of claim 1, wherein said agricultural implement comprises a combine harvester, and wherein said operator performance criterion comprises a productivity index.

6. The method of claim 5, wherein said productivity index is related to the rate at which harvesting operations have been completed.

7. The method of claim 5, wherein said productivity index is related to a grain loss measurement.

8. The method of claim 1, further comprising:
    comparing said operator performance criterion to a threshold; and
    sending an alert if said operator performance criterion fails to meet said threshold.

9. A method for monitoring operator performance during operation of an agricultural implement, comprising:
    monitoring an operating characteristic of an agricultural implement during performance of an agricultural operation;
    storing a lookup table which relates desired speeds to estimated flow rates;
    using the lookup table, determining a desired speed of the agricultural implement for the flow rate of the agricultural implement;
    adjusting the speed of the agricultural implement to the desired speed;
    determining an operator performance criterion based on said monitored operating characteristic;
    displaying said operating characteristic;
    comparing said operating characteristic to a threshold; and
    sending an alert if said operating characteristic fails to meet said threshold.

10. The method of claim 9, wherein said agricultural implement is a combine harvester, and wherein said operating characteristic is combine speed.

11. The method of claim 9, wherein said agricultural implement comprises a combine harvester, wherein said operating characteristic is a grain loss measurement, and wherein said grain loss is determined based on a secondary grain loss measurement criterion.

12. The method of claim 11, wherein said secondary grain loss measurement criterion comprises a frequency of a grain loss sensor signal.

13. The method of claim 11, wherein said secondary grain loss measurement criterion comprises a crop type selected by the user.

14. A method for monitoring operator performance during operation of an agricultural implement, comprising:
    storing a lookup table which relates desired speeds to estimated flow rates;
    using the lookup table, determining a desired speed of the agricultural implement for the flow rate of the agricultural implement;
    adjusting the speed of the agricultural implement to the desired speed;

determining a first operator performance criterion for a first operator operating a first combine harvester;

determining a second operator performance criterion for a second operator operating a second combine harvester;

transmitting said first operator performance criterion and said second operator performance criterion to a fleet monitoring device; and displaying an operator performance summary on the fleet monitoring device, said operator performance summary indicating said first operator performance criterion and said second operator performance criterion.

15. The method of claim 14, wherein said first and second operator performance criteria comprise a separator component adjustment range.

16. The method of claim 14, wherein said first and second operator performance criteria comprise a header component adjustment range.

17. The method of claim 14, wherein said first and second operator performance criteria comprise a grain loss measurement.

18. The method of claim 14, wherein said first and second operator performance criteria comprise a productivity index.

19. The method of claim 18, wherein said productivity index is determined by dividing an amount of field area harvested by an amount of time required to harvest the field area.

* * * * *